J. SCHMIDT.
FEED BAG FOR HORSES.
APPLICATION FILED DEC. 30, 1918.
1,303,403.
Patented May 13, 1919.
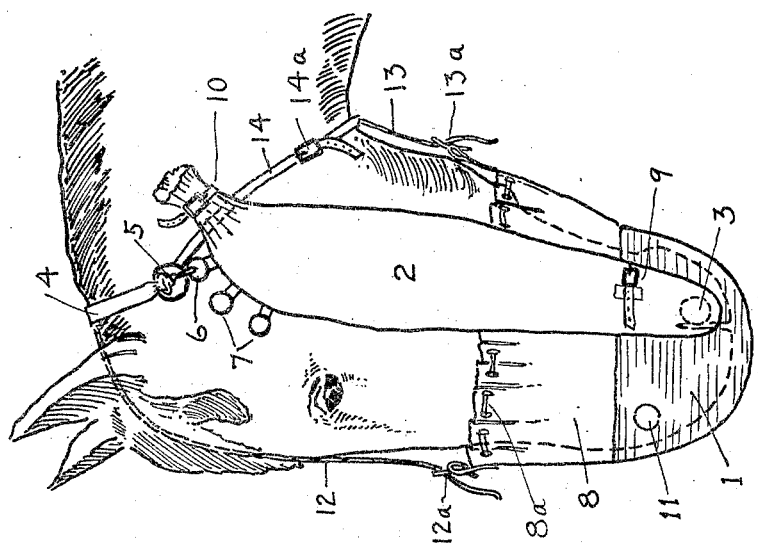
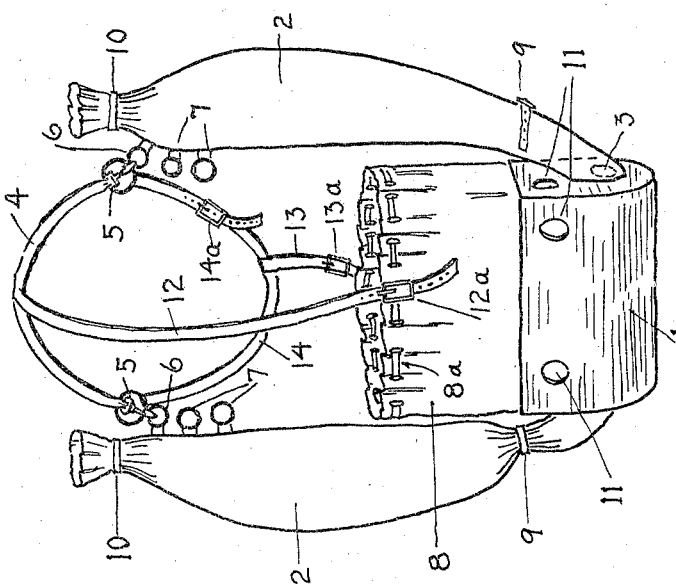
INVENTOR
JACOB SCHMIDT.
BY *Goldberg*
ATTORNEY

UNITED STATES PATENT OFFICE.

JACOB SCHMIDT, OF PORTLAND, OREGON.

FEED-BAG FOR HORSES.

1,303,403. Specification of Letters Patent. Patented May 13, 1919.

Application filed December 30, 1918. Serial No. 268,868.

*To all whom it may concern:*

Be it known that I, JACOB SCHMIDT, a subject of the Republic of Russia, and resident of Portland, in the county of Multnomah and State of Oregon, have invented a new and useful Feed-Bag for Horses, of which the following is a specification.

My invention relates to improvements in feed bags for horses in which the grain is fed in a small stream almost directly into the horse's mouth.

The objects of my invention are:

First, to prevent the spilling of feed which is so noticeable in the common variety of feed bags;

Second, to furnish the horse with no more feed at each moment than it can conveniently masticate, keeping the rest unpolluted, clean and sweet for the next feeding period.

Third, to present the food to the horse in such a way that it does not have to shake its head in order to obtain a new mouthful, so that the feeding period may actually become a period of rest and comfort for the horse instead of a period of incessant head-shaking.

I attain these objects by the mechanism illustrated in the accompanying drawing, in which:

Figure I is a side view of a horse's head showing the application of my feed bag.

Fig. II is a perspective view of the feed bag alone.

Similar numerals refer to similar parts throughout the several views.

A trough shaped basket 1 of suitable material is fitted reasonably close around a horse's snout. Attached to the sides of the basket are tubular bags 2 which serve as reservoir for the feed. Apertures 3 in the sides of the basket establish communication between latter and the reservoirs; said apertures being just large enough to admit a small but steady stream of feed into the basket and thereby into the horse's mouth. The tubular bags extend upward alongside the horse's head and are suspended from a strap 4 behind the horse's ear; for that purpose the strap 4 being provided with snap hooks 5 and the tubular bags with rings 6. Extra rings 7 being mounted at various distances along the bags to make the same apparatus apply to large or small horses alike. A ruffle 8 of pliable material at the upper edge of the basket 1, interlaced with a rubber band $8^a$ and fitting tightly around the horse's jaw, will make any spilling of feed impossible.

To fill the tubular bags, the ends at the bottom are first closed with straps 9 and, after filling, the tops of the bags also are closed with straps 10. While feeding the horse the lower straps must, of course, be unbuckled. In Fig. II the tubular bag on the near side is shown unbuckled at the bottom, while the one on the far side is shown closed.

Suitable air holes 11 in the basket, adjacent to the horse's nostrils, insure the necessary supply of air for breathing.

Basket and tubular bags are attached to the horse's head with a strap 12 running along the horse's forehead, one strap 13 running along the underside of the jaw, and one strap 14 encircling the jaw near the throat. All three last-named straps have buckles $12^a$, $13^a$, and $14^a$ respectively, for lengthening or shortening according to the size of the horse's head.

Having fully described my invention, it will be seen that my objects have been accomplished, and though I have shown the preferred form of my apparatus, I reserve to myself the right to make minor changes in construction, providing I do not violate the spirit and principle of my invention.

I claim:

1. A device of the character described, comprising a trough-shaped basket, a contractible ruffle at the upper edge of the basket adapted to prevent during the feeding period a spilling of feed from the basket, tubular feed bags at opposite ends of the basket adapted to counterbalance the load on the animal's head and being capable of discharging their contents into the basket, a series of rings along the exterior walls of the feed bags adapted to engage snap hooks, a strap for suspending the feed bags with the basket and having a snap hook at each end for engaging said rings at the feed bags.

2. A device of the character described, comprising two tubular bags, a basket between the bags and depending from the lower ends of the latter, the interior of the bags communicating with the interior of the basket, a strap connecting detachably the upper ends of said bags, a contractible ruffle at the upper edge of the basket, adjustable straps between the upper edge of said ruffle and the first-named strap to hold ruffle and basket in proper position.

<div align="right">JACOB SCHMIDT.</div>